Nov. 13, 1928.

H. JOHNSON ET AL 1,691,812

ELECTRIC BRAKE FOR AUTOMOBILES

Filed Oct. 26, 1927   2 Sheets-Sheet 1

Harold Johnson
L. O. Aune
INVENTOR

BY Victor J. Evans
ATTORNEY

WITNESS:
R. A. Thomas

Nov. 13, 1928.  1,691,812
H. JOHNSON ET AL
ELECTRIC BRAKE FOR AUTOMOBILES
Filed Oct. 26, 1927  2 Sheets-Sheet 2
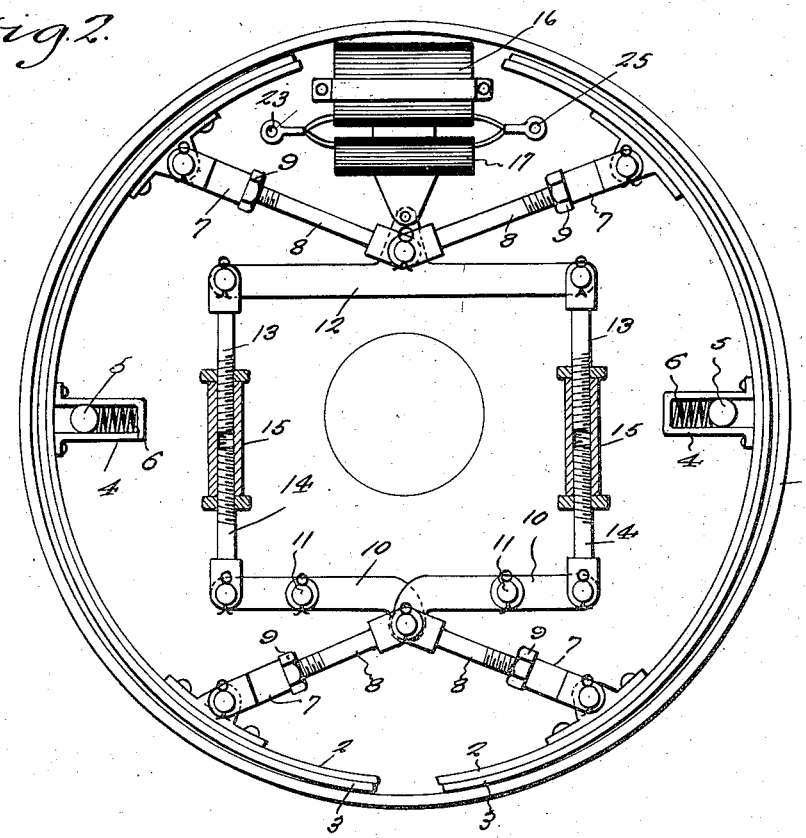
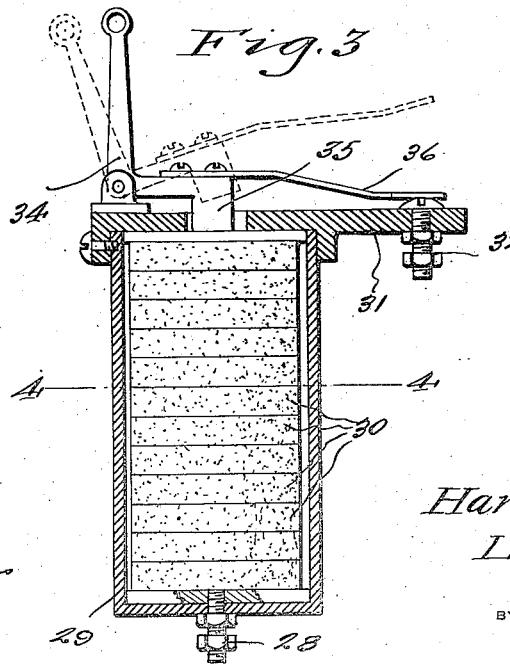
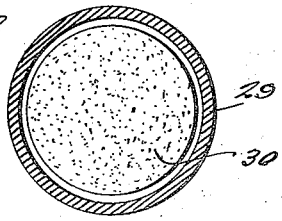
Harold Johnson
L. O. Aune
INVENTOR Patented Nov. 13, 1928.

1,691,812

UNITED STATES PATENT OFFICE.

HAROLD JOHNSON AND LENNIE O. AUNE, OF WINDOM, MINNESOTA.

ELECTRIC BRAKE FOR AUTOMOBILES.

REISSUED

Application filed October 26, 1927. Serial No. 228,906.

This invention relates to an electric brake for motor vehicles and the like, the general object of the invention being to provide magnectic means for expanding the brake bands with a switch for controlling the circuit of the magnetic means, such switch being so constructed that the amount of current passing to the magnetic means is regulated by the pressure exerted upon the switch arm.

Another object of the invention is to so arrange the band expanding members that a single magnetic means will operate the same.

This invention also consists in certain other features of construction and in the combination and arrangement of the several parts, to be hereinafter fully described, illustrated in the accompanying drawings and specifically pointed out in the appended claims.

In describing our invention in detail, reference will be had to the accompanying drawings wherein like characters denote like or corresponding parts throughout the several views, and in which:—

Figure 2 is an elevation of the brake assembly of a wheel, with parts in section.

Figure 3 is a section through the switch member.

Figure 4 is a section on line 4—4 of Figure 3.

Figure 1:
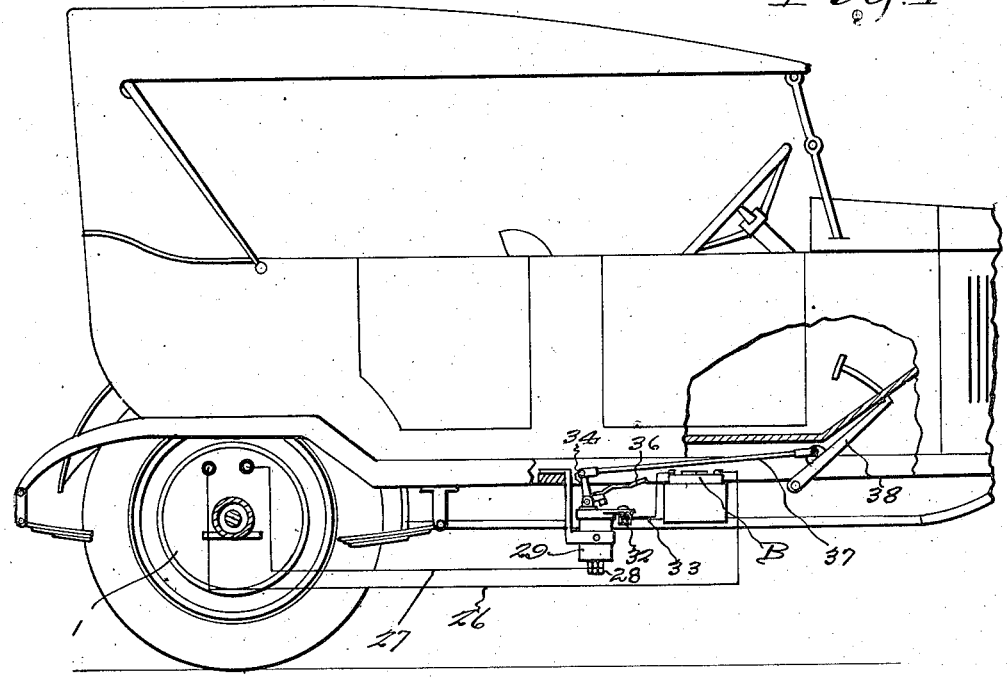
Figure 1 is a diagrammatic side elevation of an automobile, showing the invention in use.
Figure 5:
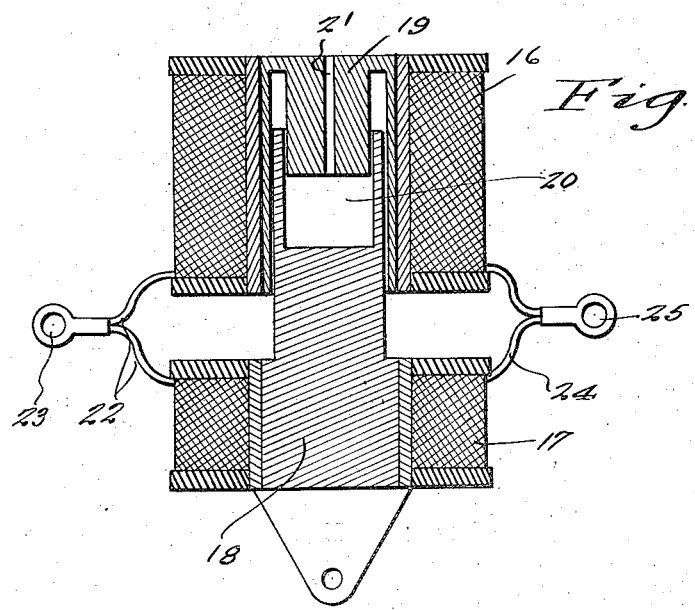
Figure 5 is a sectional view through the magnetic means.

In these views, 1 indicates a drum which forms part of the wheel of a vehicle and 2 indicates a pair of brake bands having the usual linings 3 thereon for engaging the inner circumference of the drum to prevent or check movement of the wheel. Each band is yieldingly supported at its center through means of a bracket 4 attached to the center of the band and receiving a stationary rod 5, a spring 6 being placed in each bracket and bearing against the closed end thereof and against the rod so that the spring tends to hold the band out of engagement with the drum. A pair of internally threaded members 7 is pivotally connected with each band or shoe, one adjacent each end thereof and a rod 8 has its threaded end engaging each member 7, a nut 9 locking the parts in adjusted position. Two levers 10 are each pivoted to a projection 11 carried by the axle and the bent inner ends of these levers are pivoted to the two lower rods 8. A bar 12 has a threaded rod 13 pivoted to each end thereof and the outer end of each lever 10 is pivoted to a threaded rod 14 and each rod 14 is connected with a rod 13 by an internally threaded sleeve 15. The central part of the bar 12 is pivoted to the inner ends of the upper bars 8.

The magnetic means comprises an upper coil 16 and a lower coil 17, the lower coil having a core 18 which extends into the bore of the upper coil, the upper coil being provided with a central projection 19 which is adapted to extend into a socket 20 formed in the core and this member 19 has a central passage 21 so that air can escape from the socket 20 as the core moves upwardly into the upper coil 16. Conductors 22 connect each coil with a terminal 23 and conductors 24 connect each coil with a terminal 25. The terminal 23 is connected by a conductor 26 with the battery B and a conductor 27 connects the terminal 25 with a terminal 28 arranged at the bottom of a switch casing 29 which contains a plurality of carbon disks 30, the lower one of which is in contact with the terminal 28. The cover 31 of the switch casing carries a terminal 32 which is connected by a conductor 33 with the second terminal of the battery B. A switch arm 34 is pivoted to the cover and has a part 35 extending through a hole in the cover so that this part will engage the upper carbon disk 30 when the switch arm is in operative position. The switch arm has a strip 36 fastened thereto for engaging the terminal 32. This arm is connected by a link 37 with a foot pedal 38.

From the foregoing it will be seen that when the foot pedal is depressed, the arm 34 will be tilted from the dotted line position to the full line position shown in Figure 3 and thus the circuit to the magnetic means will be closed by the strip 36 coming in contact with the terminal 32. The current will pass from the battery to the terminal 32 and through the strip 36 and projection 35 of the switch arm through the carbon disks to the terminal 28 from which it will pass to the magnetic means through the conductor 27 and from such means it will return to the battery over the conductor 26. Thus the magnetic means will be energized so that the lower coil will be raised and this movement of the lower coil will be transmitted to the bar 12 so that the upper adjustable members will press the upper portions of the shoes against the drum 1 and at the same time the levers 10 will be moved on their pivots 11 through means of the adjustable connections between the levers and the bar 12 so that the lower adjustable members will force the lower portions of the shoes against the drum. Thus the shoes will be pressed against the drum 1 of the wheel and this pressure is regulated by the force with which the pedal is depressed, as the greater the pressure of the switch arm on the carbon disks, the greater will be the amount of current passing through the magnetic means. Thus the operator can apply his brakes lightly to simply check the vehicle or he can apply them with great force to bring the vehicle to a stop. As will be seen, the parts are adjustable so that the brakes can be adjusted very easily and quickly and it will also be seen that this arrangement eliminates brake rods, springs and the like. We prefer to operate each brake on a separate circuit so that if the wires leading to one brake should be damaged, the brakes of the other wheels will still operate.

It is thought from the foregoing description that the advantages and novel features of our invention will be readily apparent.

It is to be understood that we may make changes in the construction and in the combination and arrangement of the several parts, provided that such changes fall within the scope of the appended claims.

What we claim is:—

1. A brake of the class described comprising a pair of shoes for engaging the part to be braked, magnetic means comprising an upper coil and a lower coil and an armature connected with the lower coil and passing into the upper coil, adjustable means for causing the movement of the lower coil to press the shoes against the said part, a circuit for the two coils, a switch in the circuit and manually operated means for operating the switch.

2. A brake of the class described comprising a pair of shoes for engaging the part to be braked, magnetic means comprising an upper coil and a lower coil and an armature connected with the lower coil and passing into the upper coil, adjustable means for causing the movement of the lower coil to press the shoes against the said part, a circuit for the two coils, a switch in the circuit, manually operated means for operating the switch, such means comprising a pedal and a link connecting the pedal to the switch arm.

3. A brake of the class described comprising a pair of shoes for engaging the part to be braked, magnetic means comprising an upper coil and a lower coil and an armature connected with the lower coil and passing into the upper coil, adjustable means for causing the movement of the lower coil to press the shoes against the said part, a circuit for the two coils, a switch in the circuit, manually operated means for operating the switch, such means comprising a pedal, a link connecting the pedal to the switch arm and said switch comprising a casing, a plurality of pieces of carbon therein and a switch arm having a part engaging the pieces for pressing them together when the pedal is depressed.

In testimony whereof we affix our signatures.

HAROLD JOHNSON.
L. O. AUNE.